Jan. 31, 1956 G. V. WOODLING 2,732,862
HELICAL FLUID TUBE
Filed Dec. 2, 1950
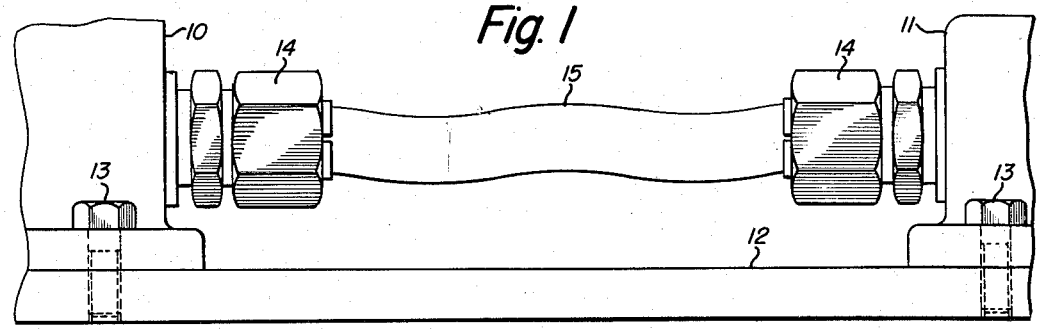
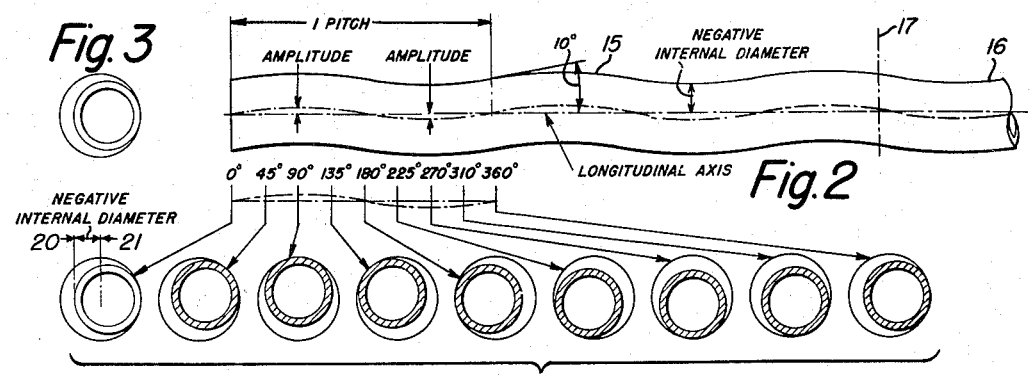
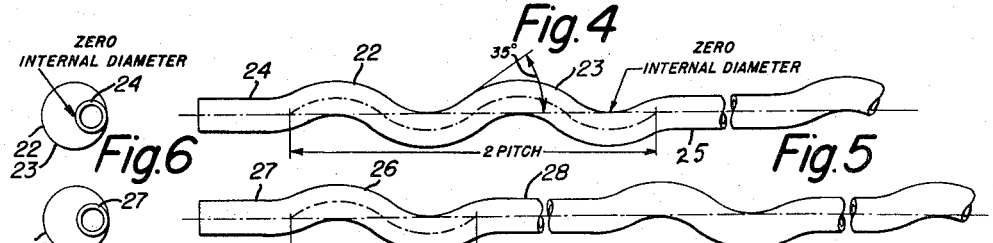
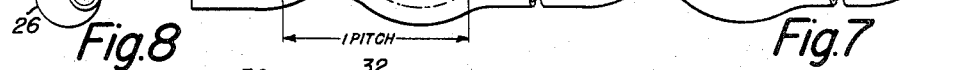
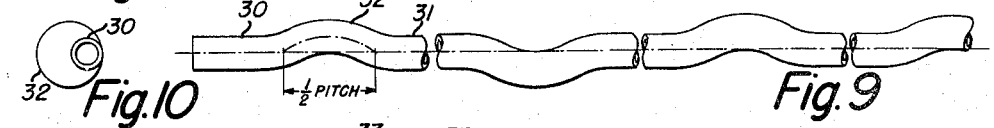
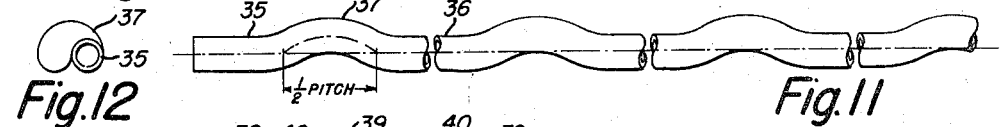
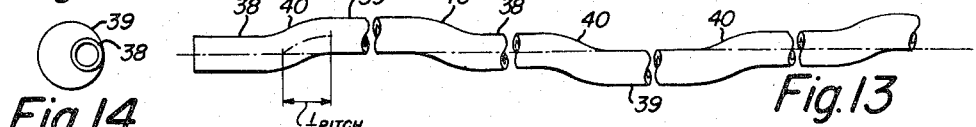
INVENTOR.
George V. Woodling

United States Patent Office

2,732,862
Patented Jan. 31, 1956

2,732,862

HELICAL FLUID TUBE

George V. Woodling, Cleveland, Ohio

Application December 2, 1950, Serial No. 198,855

1 Claim. (Cl. 138—47)

My invention relates in general to tubing and more particularly to tubing used for hydraulic or fluid circuits.

With the modern trends of using higher pressures in hydraulic circuits, there is a growing difficulty of manufacturing hydraulic tubing which will withstand the vibration incident to fluid pressure shocks and mechanical shocks. The tube vibrations caused by peak fluid pressure shocks is in addition to the vibrations which are normally caused by mechanical shocks resulting from the relative movement or quivering of localized parts of the machine such as pumps, cylinders and valves between which the hydraulic tubing extends. The total effect of these vibrations tends to cause leakage of the hydraulic fluid at the points of connecting of the tubing to the tube couplings or fittings mounted in the hydraulic equipment. It has been found that this leakage may be reduced somewhat by clamping or otherwise securing the hydraulic tubing to the machinery or hydraulic equipment so that the amplitude of the vibrations of the tubing is held within close limits. However, there are many installations in which it is extremely difficult or awkward to clamp the tubing to the hydraulic equipment without encountering a considerable amount of expense.

In many instances in the installation of hydraulic tubing, it becomes engineeringly essential that the hydraulic tubing make a direct or straight run instead of an indirect run between two points of connection; namely, the two points where the ends of the tubing are connected to the tube fittings. In ordinary installation work, it is highly recommended that the straight run be avoided because from experience it has been found that when a tubing is installed as a straight run between two points of connection, the possibility of leakage at the tube fittings is greatly aggravated. One reason why a straight run produces an aggravated situation is the fact that the tubing through which the hydraulic oil flows is exposed to a different temperature than the base or other parts of the hydraulic equipment such as the pumps, valves and cylinders. The mechanical strains in a direct or straight run tubing incident to expansion and contraction of the tubing caused by this change or difference in temperature must be relieved at some point which usually takes place at the tube fittings or couplings where the ends of the straight run tubing are anchored to the hydraulic equipment. Another reason why the installation of a straight run tubing gives aggravated trouble is that the hydraulic equipment such as the pumps, cylinders and valves, to which the two ends of the straight run tubing are anchored, are exposed to independent mechanical shocks or quivering so that mechanical strains are transmitted to the points of connection of the tubing at the hydraulic tube couplings. The mechanical strains which are set up in the straight run tubing regardless whether it is caused by the expansion and contraction due to temperature changes or to the mechanical strains caused by mechanical shocks or quivering of localized parts of hydraulic equipment, result in the same trouble; namely, leakage at the tube couplings where the tubing is anchored to the hydraulic equipment.

An object of the present invention is to construct a hydraulic or fluid tube of such configuration that the tube will compensate for changes in the contraction and expansion incident to changes in temperature and to mechanical shocks or quivering which may be set up in the localized parts in the hydraulic equipment.

Another object of the invention is the provision of constructing a hydraulic or fluid tube of such configuration that the tube need not be clamped or otherwise secured to the parts of the hydraulic equipment in order to dampen vibrations caused either by fluid peak shocks or by mechanical shocks or quivering.

Another object of the invention is the provision of constructing a hydraulic or fluid tube of such configuration that the internal resistance to the flow of the fluid is not appreciably increased.

Another object of the present invention is the provision of constructing a hydraulic or fluid tube of such configuration that it may be safely and satisfactorily employed as a straight run between two coupling points.

Another object of the invention is the provision of a hollow helical tube having physical structure means residing within minimum and maximum limits of helical amplitude and of longitudinal pitch.

Another object of the invention is the provision of constructing a hollow tube in an alternate series of straight and curved path sections.

Another object of the invention is the provision of constructing a hollow tube in a curved or helical path section terminating at its opposite ends in straight portions.

Other objects and a fuller understanding of my invention may be had by referring to the following description and claim, taken in conjunction with the accompanying drawings, in which:

Figure 1 is a side view illustrating a short tube constructed in the form of a helical body embodying my invention and employed as a direct or straight run between two hydraulic units, such, for example, as between a pump and a cylinder, the amplitude of the helical body being substantially equal to the wall thickness of the tube which has a one-half inch outside diameter;

Figure 2 is a side view of an extended or long tube constructed in the form of a helical body from which the short tube in Figure 1 may be cut;

Figure 3 is an end view of the helically formed tube shown in Figure 2, looking from left to right;

Figure 4 shows a series of cross-sectional views of the helical tube for a section length of one pitch, the cross sections being taken at intervals of 45 degrees, ranging from zero to 360 degrees, with the view at zero degrees being an end view;

Figure 5 shows a modified form of the tube comprising an alternate series of straight sections with an intermediate helical section therebetween of two pitch lengths, the amplitude of the helical sections being substantially equal to one-half the diameter of the tube which has a one-quarter inch outside diameter;

Figure 6 is an end view of the tube shown in Figure 5, looking from left to right;

Figure 7 shows a second modified form of the tube comprising an alternate series of straight sections with an intermediate helical section therebetween of one pitch length, the amplitude of the helical sections being substantially equal to one-half the diameter of the tube which has a one-quarter inch outside diameter;

Figure 8 is an end view of the tube shown in Figure 7, looking from left to right;

Figure 9 shows a further modified form of the tube comprising an alternate series of straight sections with a one-half pitch helical section therebetween, and one-half pitch sections appearing on opposite sides of the longitudinal axis of the tube;

Figure 10 is an end view of the tube shown in Figure 9, looking from left to right;

Figure 11 shows a further modified form of the tube comprising an alternate series of straight sections with a one-half pitch helical section therebetween, the one-half pitch sections appearing on the same side of the longitudinal axis of the tubing;

Figure 12 is an end view of the tube shown in Figure 11, looking from left to right.

Figure 13 is a further modified form of the tube comprising an alternate series of straight sections with a helical section of one-quarter pitch herebetween; and Figure 14 is an end view of the tube shown in Figure 13, looking from left to right.

My invention, which comprises a new tube construction, is shown in Figure 1 as being installed as a short straight run between two hydraulic units such for example, as between a hydraulic pump 10 and a hydraulic cylinder 11 which may be mounted in spaced relation with respect to each other upon a common base 12 by means of stud bolts 13. The short tube in Figure 1, which comprises one form of the invention, is identified by the reference character 15 with each end thereof connected respectively to the pump 10 and the cylinder 11 by means of hydraulic tube fittings 14 which may be of any standard type. In installation, the short tube 15 may be cut off the end of an extended or long tube 16 such as shown in Figure 2, the lateral line 17 indicating the place of the cut. In mounting the tube 15 between the two hydraulic fittings 14, one or both of the hydraulic units; namely, the pump or the cylinder may be dismantled or loosened from the base by removing the stud bolts 13 so that the ends of the tube may be inserted endwise into the hydraulic couplings, after which the hydraulic units are then firmly secured to the base 10 by tightening the stud bolts 13.

The various pieces of short tubes which are required for a hydraulic installation are cut or fabricated from a long or extended tube, the tube 15 being an example of such a short tube. The long tubes, such as 16, may be helically formed at the mill or point of manufacture and then shipped to the place of installation where they are cut into short pieces to fit the hydraulic equipment. For hydraulic installations, the commercial standard tubes usually begins at one-quarter inch outside diameter and extends to one and one-half inches outside diameter, the diameters generally increasing from one-quarter inch to one inch at intervals of one-eighth inch and above one inch at intervals of one-quarter inch.

In this application, the following definitions apply:

Longitudinal axis is the true axis of a straight tube before it is helically formed and is identified as the straight line in Figure 2 to which arrow points that extends from legend: Longitudinal axis.

Helical axis is the real axis of a helical tube and is identified as the line in Fig. 2 which crosses the longitudinal axis at alternate intervals.

Helical amplitude is a measure of the peak deviation or maximum lateral distance between the helical axis and the longitudinal axis and is identified in Fig. 2 as the lateral distance between the opposing arrows of which the upper arrow extends from the legend: Amplitude.

Minimum helical amplitude of a tube is present when the helical amplitude is approximately equal to the wall thickness of the tube, and such a tube is illustrated in Fig. 2.

Maximum helical amplitude of a tube is present when the helical amplitude is approximately equal to one-half the outside diameter of the tube, and such a tube is shown in Fig. 5.

Negative internal diameter of a helical tube is a measure of the lateral distance between the longitudinal axis and the outside diameter of the tube and is identified in Fig. 2 as the lateral distance between the two arrows bearing the legend: Negative internal diameter.

Zero internal diameter of a helical tube is present when the lateral distance between the longitudinal axis and the outside diameter of the tube is zero and such a tube is shown in Figs. 5 and 6.

Longitudinal pitch of a helical tube is a measure of the longitudinal distance between two corresponding points on the helical axis and is identified in Figs. 2 and 7 as the longitudinal distance between the two arrows bearing the legend: 1 pitch.

Lower limit of longitudinal pitch for tube with minimum helical amplitude is not less than approximately 4 times the outside diameter of the tube for all diameters of tubing.

Upper limit of longitudinal pitch for tube with minimum helical amplitude is not greater than approximately twice that of the lower limit of longitudinal pitch.

First range of longitudinal pitch includes the values between the lower and upper limits of longitudinal pitch for minimum helical amplitude.

Lower limit values of longitudinal pitch for tube with maximum helical amplitude is not less than approximately 5.5 times the outside diameter of the tube for ¼ inch tube; 6.0 for ⅜ inch tube; 6.0 for ½ inch tube; 5.8 for ⅝ inch tube; 5.8 for ¾ inch tube; 5.8 for ⅞ inch tube; 6.5 for 1 inch tube; 6.6 for 1¼ inch tube; and 7.0 for 1½ inch tube.

Upper limit values of longitudinal pitch for tube with maximum helical amplitude is not greater than approximately twice that of the upper limit values of longitudinal pitch.

Second range of longitudinal pitch includes values between the lower and upper limit values of longitudinal pitch for maximum helical amplitude.

In my invention, the value of the helical amplitude depends upon the installation and pressure requirements of the hydraulic circuit. The minimum helical amplitude of the helical body is preferably substantially equal to the wall thickness of the tube, and the maximum value amplitude is preferably substantially equal to one-half the outside diameter of the tube. Thus a standard one-half inch tube with a wall thickness of .065 of an inch would have, a minimum helical amplitude of .065 of an inch and, a maximum helical amplitude of one-quarter of an inch. In the drawings, the tubes shown in Figures 1 to 4 are helically formed with a minimum helical amplitude; namely, at a value substantially equal to the wall thickness of the tube. The tubes shown in Figures 5 to 14, which are one-quarter of an inch in diameter, are helically formed with a maximum helical amplitude; namely, at a value substantially equal to one-half the outside diameter of the tube, or an amplitude of one-eighth of an inch. With a minimum helical amplitude, the ends of the helical tube may be inserted directly into the tube couplings as shown in Figure 1. With a maximum helical amplitude, the ends of the helical section are preferably terminated in straight sections, whereby the straight sections may be inserted into the tube couplings. Straight end sections may also be used with helical body sections of minimum helical amplitudes to assure easy insertion of the ends of the tube into the couplings. Helical tube sections with straight ends are shown in Figures 5 to 14. While I have illustrated my invention with one-quarter and one-half inch tubes, it is to be understood that my invention applies equally well to tubes of other outside dimensions.

The length of each pitch for the helically formed tube, for the minimum helical amplitude is preferably in a first range having a lower limit not less than approximately 4 times the outside diameter of the tube and having an upper limit not greater than approximately twice that amount. This range of values is for all sizes of tube diameters. Thus, a tube having a one-half inch outside diameter would have a pitch length of two inches for the lower value of said range and four inches for the upper value of said range and a tube having a one inch outside diameter would have a pitch length of four inches for the lower value of said range and eight inches for the upper value of said range. In other words, the ratio of the pitch length to the outside diameter of the tube, for minimum helical amplitude falls in a range of 4 to 8. For maximum helical amplitude, the pitch range, which is called second range of longitudinal pitch, depends upon the size of the tube diameters and the extent that the tube wall may be helically bent or stretched without weakening the tube wall. This is particularly true for sharp helical bends, because it is essential that the degree of curvature of the helix be not too great as to weaken or damage the tube wall structure by making too sharp a bend. I find that for a one-quarter inch tube, the lower limit values of longitudinal pitch for tube with maximum helical amplitude may not be less than approximately 1.375 inches; for a ⅜ inch tube, 2.25 inches; for a ½ inch tube, 3 inches; for a ⅝ inch tube, 3.625 inches; for a ¾ inch tube, 4.312 inches; for a ⅞ inch tube, 5 inches; for a 1 inch tube, 6.5 inches; for a 1¼ inch tube, 8.25 inches; and for a 1½ inch tube, 10.5 inches. For upper limit values of longitudinal pitch for tube with maximum helical amplitude, the ratio of the pitch length to the outside diameter of the tube is preferably not less than approximately 5.5 for ¼ inch tube; 6.0 for ⅜ inch tube; 6.0 for ½ inch tube; 5.8 for ⅝ inch tube; 5.8 for ¾ inch tube; 5.8 for ⅞ inch tube; 6.5 for 1 inch tube; 6.6 for 1¼ inch tube; and 7.0 for 1½ inch tube. The ratio values given above represent the number of times that the pitch is longer than the outside diameter of the tube. The upper limit values of longitudinal pitch for maximum helical amplitudes, are approximately twice the above listed amounts.

For maximum helical amplitudes, the radius bend of the helical curvature for the lower limit of the second pitch range is approximately 9/16 of an inch for a ¼ inch tube; 11/16 of an inch for a ⅜ inch tube; 1¼ of an inch for a ½ inch tube; 1½ of an inch for a ⅝ inch tube; 1¾ inches for a ¾ inch tube; 2 inches for a ⅞ inch tube; 3 inches for a 1 inch tube, 3¾ inches for a 1¼ inch tube; and 5 inches for a 1½ inch tube. Helical curvatures with these radius bends are not too sharp to weaken or damage the wall structure of the tube.

For the above-mentioned radius bends which are for the lower limit of the second pitch range for maximum helical amplitudes, and which are the most critical bends, the ratio of the radius of curvature to the outside diameter of the tube is as follows: the ratio for ¼ inch tube is 2.26; for ⅜ inch tube is 2.5; for ½ inch tube is 2.5; for ⅝ inch tube is 2.4; for ¾ inch tube is 2.34; for ⅞ inch tube is 2.28; for 1 inch tube is 3.0; for 1¼ inch tube is 3.0; and for 1½ inch tube is 3.33.

Summarizing, the entire pitch range, extending from the lower values of the first pitch range for minimum helical amplitudes to the upper values of the second pitch range for the maximum helical amplitudes, is from 4 to 14 times the outside diameter of the tube.

For minimum amplitudes and for the lower values of the pitch range, the helical angle, which is the included angle between a line drawn substantially tangent to the helix and its longitudinal axis, is in the neighborhood of 10 degrees, see Figure 2. For maximum amplitudes and for the lower values of the pitch range, the helical angle is in the neighborhood of 35 degrees, see Figure 5.

It is to be observed that the helical body or tube does not have a positive internal helical diameter in the sense that one can look through the inside of the helical body as one can look through a coil spring. Thus, in Figure 3, it is noted that, for minimum helical amplitudes, the helical body has a negative internal helical diameter which is the space between the two arrows 20 and 21, and which is less than one-half of the outside diameter of the tube minus two times the helical amplitude or the wall thickness of the tube. The value of the internal helical diameter, for maximum amplitudes, is equal to zero. This is true because the amplitude is equal to one-half the outside diameter of the tube. By keeping the internal diameter of the helical body to zero or a negative value, the longitudinal rigidity of the tube is assured, in that the helical tube will not readily elongate or tend to easily unwind, because the unwinding effect which would lengthen the tube is resisted by the metal of the tubing which is within the central helical area of the negative internal diameter. In other words, by keeping the internal diameter of the helical body to a negative value, the longitudinal coil spring effect is resisted, as distinguished from a helical body having a positive helical diameter whereby one may look therethrough or insert a longitudinal core therethrough.

The effect of forming the tube in a helical body having a negative internal diameter is to give a stiffness or lateral rigidity to the tube beyond that afforded by the wall thickness alone. Thus, tube lateral vibrations incident to peak fluid shocks or mechanical shocks are minimized and the requirement for bracing or clamping the tube is eliminated. Accordingly, one benefit derived from making the tube in the form of a helical body is that it laterally stiffens the tube to the extent that lateral tube vibrations are minimized, thereby ending to reduce the trouble of the leakage at the couplings. The effect of increasing the rigidity or stiffness of the tube may be appreciated by observing the cross-sectional views in Figure 4, which illustrates the helical course taken by the tubing for one pitch length, the cross-sections being taken at intervals of 45 degrees. Thus, the added rigidity and stiffness arises from the fact that the effective wall thickness of the tube has been multiplied. This multiplying effect of the rigidity is an important feature with respect to insuring long life to the tubing and to preventing hydraulic leakage at the hydraulic fittings. While Figure 4 shows the cross-sectional views taken at intervals of 45°, it is obvious, of course, that the cross-section of the tube taken at any point therealong and normal to the helical axis is substantially the same as the cross-section taken at any other point therealong and normal to the helical axis.

Another benefit arising from constructing the tube in the form of a helical body is the fact the helical tube may longitudinally "give" to compensate for changes in the elongation incident to temperature changes or incident to mechanical vibrations, quiverings or strains, slightly varying the spacing between the two hydraulic couplings 14 of the hydraulic units such as the hydraulic pump 10 and the cylinder 11. When a non-helical or straight tubing is employed between two spaced connection points, such as between the two couplings 14, it is essential that the longitudinal strains set up in a straight or non-helical tube "give" or be relieved at some point which usually occurs at the connection between the tube and the hydraulic fittings and this relief of the strain or "give" at the couplings results in hydraulic leakage. By employing a tube of my invention which is of a helical body, variations in the elongation of the tube compensate for this mechanical strain and thus the mechanical and fluid connection between the tube and the hydraulic fittings remains perfect and insures a leak-proof joint. The amount of the "give" which is compensated by the helical tubular body need be only a few thousandths of an inch, and this amount is adequately taken care of by making the tube in the form of a helical body with a negative internal diameter. Summarizing, my tube which is of a helical form with a negative internal diameter, is laterally stable or stiff which eliminates the requirement of clamping the tube to the hydraulic equipment to minimize lateral tube vibrations and is longitudinally stable against easy unwinding or ready elongations, yet compensating for small variations in length to relieve mechanical longitudinal strains in the tube which would otherwise have to be relieved at the connection between the tubing and the hydraulic fittings which latter condition would destroy the fluid seal.

With maximum amplitudes it is preferable that the short pieces, which are required for the installation and which are to be cut off the long tubes, have straight end sections for insertion in the tube couplings, see Figures 5 to 12. Tubes with minimum amplitudes may also have straight end sections for easy insertion into the tube fittings.

As an alternative method of forming the helical sections, the short pieces may be helically fabricated at the place of the installation by passing the intermediate portion only of a straight short tube through a helical forming machine, thus leaving the end sections straight to insert into the tube couplings.

The Figures 5 and 6 comprise an alternate series of straight sections 24 and 25 with intermediate helical sections 22 and 23 therebetween of a total of two pitch lengths, the amplitude of the helical sections being substantially equal to one-half the diameter of the tube which has a one-quarter inch outside diameter. The internal helical diameter is substantially zero.

The Figures 7 and 8 comprise an alternate series of straight sections 27 and 28 with an intermediate helical section 26 therebetween of one pitch length. Otherwise the tube shown in Figure 7 is substantially the same as that shown in Figure 5.

The Figures 9 and 10 comprise an alternate series of straight sections 30 and 31 with a one-half pitch helical section 32 therebetween, the one-half pitch sections appearing on opposite sides of the longitudinal axis of the tube.

The Figures 11 and 12 comprise an alternate series of straight sections 35 and 36 with a one-half pitch helical section 37 therebetween appearing on the same side of the longitudinal axis of the tube.

The Figures 13 and 14 comprise an alternate series of straight sections 38 and 39 with an intermediate one-quarter pitch helical section 40. The hollow tube of Figures 13 and 14 thus has at least first and second portions laterally offset relative to each other from opposite sides of the longitudinal axis of the tube, with each of the offset portions having curved or helical end portions 40 and a substantially straight intermediate portion therebetween.

All the Figures 5 to 14 illustrate a tube having at least two straight path sections and an intermediate curved or helical path section therebetween, with the straight path sections adapted for connection to tube fittings. The curved or helical path sections deviate from the longitudinal axis of the tube by an amount equal to or less than one-half the outside diameter of the tube and more than the wall thickness of the tube.

The length of the straight end sections may be at least twice the length of a coupling nut, plus an additional amount to make it possible to cut off a short tube of any length from a long tube to accommodate installation requirements, and yet have straight end sections to insert into the tube couplings in longitudinal alignment therewith. The straight sections are preferably long enough to be more than adequate for making right angle bends in the short tube by conventional tube benders.

For minimum helical amplitudes it has been found that the small helical angular approach to the inside of the coupling nut is advantageous, for the reason that the helical tube as it enters the hole in the back of the nut will contact or touch the internal wall of the hole and thus tend to stop tube vibrations from reaching the point of the connection of the tube and the connector body within the nut.

The purpose of the tubings shown in Figures 5 to 14 is to illustrate the fact that the helical body may be combined with straight sections whereby for ordinary installation work the operator can utilize the benefit of the straight sections as localized zones for bending the tubing and as localized zones for easy inserting of the straight sections into the inside of the tube fittings. In all events, the importance of the helical body is to increase the lateral stability of the tube against lateral vibrations and to allow the longitudinal length of the tube to "give" a small amount to compensate for the relief of longitudinal mechanical strains in the tube incident to mechanical changes and quiverings of the connected or joined parts of the hydraulic units between which the tubing runs.

While giving the above desired benefits, the resistance to the flow of the fluid through the helical sections is not appreciably increased, and to this extent the helical amplitude should preferably be not made any greater than necessary.

The helical tube disclosed and claimed herein is not limited to a perfect helical wave, but the term helical is used in a generic sense to define the general shape of the curved tube.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim as my invention:

A helical bendable tube having its wall bent to conform to a helix residing within the following range between minimum and maximum limits of helical amplitude and of longitudinal pitch, said minimum helical amplitude being defined as equal to approximately the same as the wall thickness of the tube and said maximum helical amplitude being defined as approximately equal to one-half the outside diameter of the tube, said minimum longitudinal pitch being equal to 4 times the outside diameter of the tube and said maximum longitudinal pitch being 14 times the outside diameter of the tube, the cross-section of said tube taken at any point therealong and normal to the helical axis being substantially the same as the cross-section taken at any other point therealong and normal to said helical axis.

References Cited in the file of this patent

UNITED STATES PATENTS

| | | |
|---|---|---|
| 249,547 | Reed | Nov. 15, 1881 |
| 731,124 | Park | June 16, 1903 |
| 811,016 | Whyte et al. | Jan. 30, 1906 |
| 1,315,853 | Nordling et al. | Sept. 9, 1919 |
| 1,535,531 | Isaacsen | Apr. 28, 1925 |
| 1,727,896 | Mraz | Sept. 10, 1929 |
| 1,991,788 | Cartter | Feb. 19, 1935 |
| 2,252,045 | Spanner | Aug. 12, 1941 |
| 2,505,623 | McLaughlin et al. | Apr. 25, 1950 |
| 2,587,521 | Peterson | Feb. 26, 1952 |

FOREIGN PATENTS

| | | |
|---|---|---|
| 21,071 | Norway | Jan. 30, 1911 |
| 486,690 | Germany | Nov. 22, 1929 |